United States Patent [19]

Robinson et al.

[11] 4,122,441

[45] Oct. 24, 1978

[54] ERROR DETECTION AND INDICATION SYSTEM FOR BI-PHASE ENCODED DIGITAL DATA

[75] Inventors: Robert Lee Robinson, Covina; David Casper Hoff, Temple City, both of Calif.

[73] Assignee: Lockheed Electronics Company, Inc., Plainfield, N.J.

[21] Appl. No.: 839,406

[22] Filed: Oct. 5, 1977

[51] Int. Cl.² ............................................. G08C 25/00
[52] U.S. Cl. ......................................... 340/146.1 AB
[58] Field of Search ........... 340/146.1 AB, 146.1 AV, 340/146.1 F; 360/32, 38–42

[56] References Cited

U.S. PATENT DOCUMENTS

| | | | |
|---|---|---|---|
| 3,335,224 | 8/1967 | Meslener et al. | 340/146.1 AB X |
| 3,417,333 | 12/1968 | Atzenbeck | 340/146.1 AB X |
| 3,836,956 | 9/1974 | Cross | 340/146.1 AB |
| 3,938,082 | 2/1976 | Schowe, Jr. | 340/146.1 AB X |

Primary Examiner—Jerry Smith
Attorney, Agent, or Firm—Jackson & Jones Law Corporation

[57] ABSTRACT

A real-time error detection system for bi-phase or similarly encoded digital data is disclosed. Bi-phase or similarly encoded data, which utilizes two transitions in a bit cell for either a binary "1" or a binary "0" value, and one transition in a bit cell for the other binary value inherently generates an even number of transitions of the binary value represented by the two transitions between the occurrence of the other binary value represented by one transition. Monitoring for the number of transitions of the binary value represented by two transitions provides an indication of the occurrence of an odd number of transitions. This represents an error condition. The system utilizes a logic circuit responsive to the binary "1" and binary "0" data clock retrieved from the self-clocking bi-phase encoded data. When an error condition is detected, an error indicating signal is generated.

14 Claims, 3 Drawing Figures

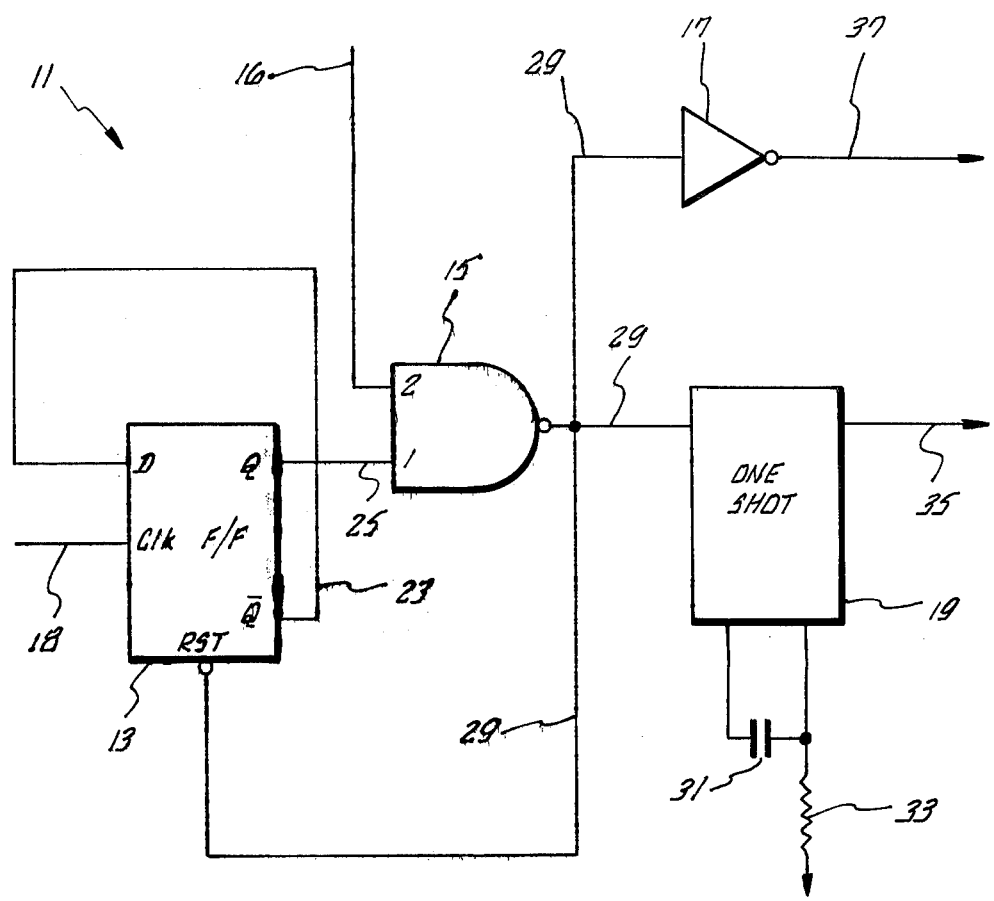
FIG_2_
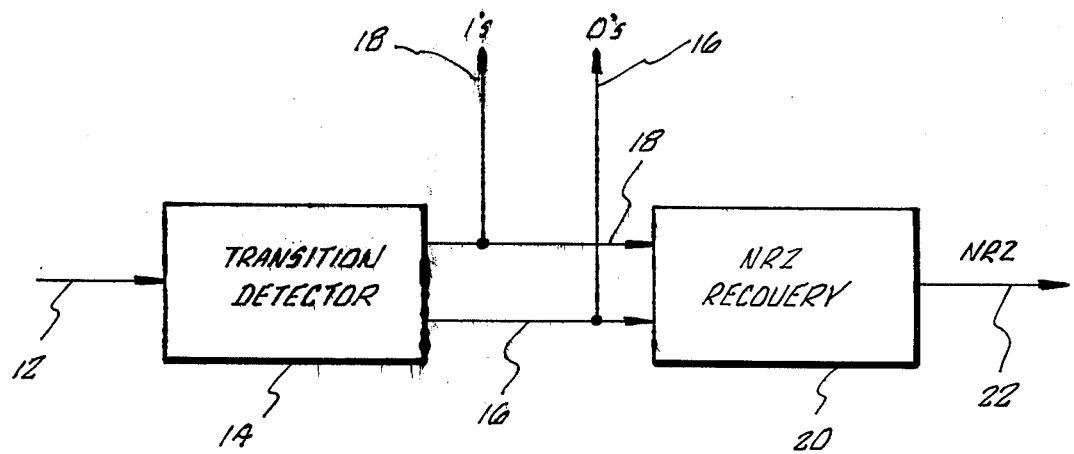
FIG_1_

ERROR DETECTION AND INDICATION SYSTEM FOR BI-PHASE ENCODED DIGITAL DATA

BACKGROUND OF THE INVENTION

1. Field of the Invention

The present invention relates generally to improvements in error detection circuits and, more particularly, pertains to a new and improved error detection system which provides real-time error detection on a continuous stream of digital data.

2. Description of the Prior Art

In the field of digital data error detection, parity error checking schemes are well known and widely practiced. However, such parity checking schemes largely require the use of an additional parity bit being added to a string of "1" and "0" bits. Traditionally, the one bits are counted in a particular length or string of bits which may make up a segment or computer word. If the odd parity system is being utilized, then the number of one bits in every computer word must be odd. If the particular coding of a particular computer word provides an even number of one bits, a binary one parity bit is added. If the particular coding of a particular computer word provides an odd number of one bits, then an 0 parity bit is added.

As can be seen, this procedure requires the counting of the one bits and circuitry to generate the appropriate parity bit at the transmitting end. At the receiving end, again, circuitry must be provided which counts the number of one bits. In addition, circuitry which determines whether the count is odd or even, and circuitry to generate an error condition, if the count is even, must be provided. The same is true if the even parity check is utilized. The odd parity check system is the most widely used, however.

Because of the requirement that a parity bit must be added to provide the odd and even parity, error detection cannot occur on a real-time basis as the data is actually flowing from one location to another. The present invention does not utilize parity bits. The present invention detects the occurrence of errors in a serial data stream that may be any length on a real-time basis.

OBJECTS AND SUMMARY OF THE INVENTION

An object of this invention is to provide a reliable yet inexpensive real-time error detection system for bi-phase encoded or similarly encoded digital data.

This object and the general purpose of this invention is accomplished by utilizing the characteristic of bi-phase or other like encoded data that produces an even number of transitions for one binary value ("1" or "0") and an odd number of transitions for the other binary value ("1" or "0") when no error has occurred in the decoding process. The binary values ("1" or "0") that produce the even number of transitions regardless of the data content is monitored. The number of transitions occurring for such binary values in between each occurrence of the other binary values is counted. If an odd count of transitions is determined, an error signal is generated. This system detects errors whether it occurred in the binary "1" or binary "0" values.

BRIEF DESCRIPTION OF THE DRAWINGS

Other objects and advantages of this invention will hereinafter become more fully apparent from the following description of the annexed drawings which illustrate a preferred embodiment and in which like referenced numerals designate like parts throughout the figures thereof and wherein:

FIG. 1 is a block diagram illustrating the decoding circuitry with which the present invention may be utilized.

FIG. 3 is a waveform diagram illustrating the operation of the circuitry illustrated in FIG. 2.

DESCRIPTION OF THE PREFERRED EMBODIMENT

Figure 2:
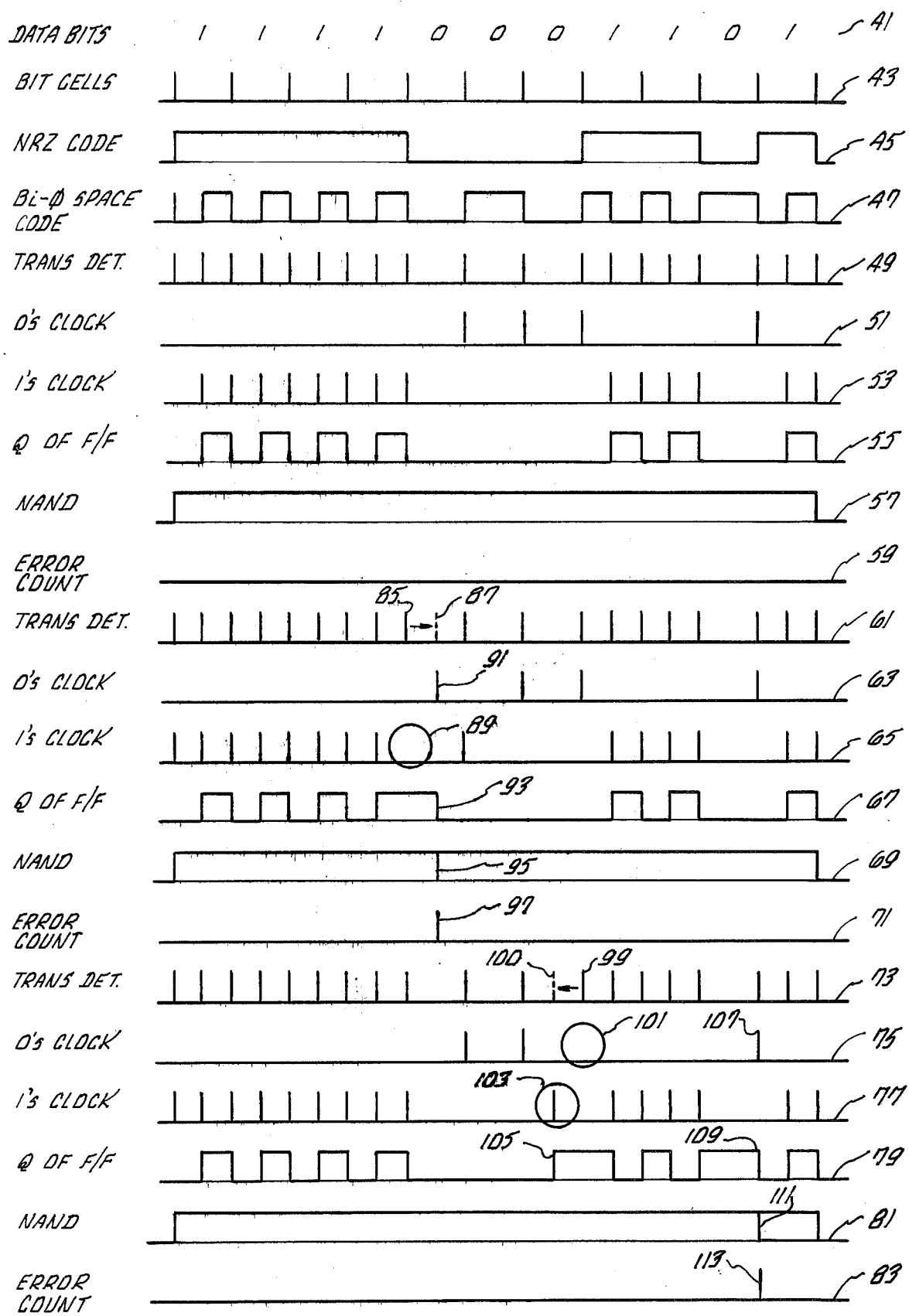
FIG. 2 is a logic diagram of the error detection circuitry of the present invention.

The present invention checks the parity error of a serial stream of bi-phase or similarly encoded data without the addition of parity bits on a real-time basis, as the bi-phase or similarily encoded data is decoded. The parity error check is performed many times within a computer word, depending on the length of the computer word and the actual encoding thereof. The longer the computer word, the more parity error checks that are performed on the word.

Bi-phase binary encoding is well known as a self-clocking binary encoding scheme wherein two transitions occur within a bit cell period for one binary bit value and one transition occurs within a bit cell period for the other binary bit value. Because the number of transitions for one bit value, such as binary "1," is even and the number of transitions for the other bit value, such as the binary "0," is odd, any series of binary "1" values encoded by the bi-phase encoding scheme will generate an even number of transitions in between each binary "0" bit value.

This is true for the bi-phase-level and bi-phase-space encoding schemes. The bi-phase-mark encoding scheme, on the other hand, uses a single transition in a bit period for a binary "1" value and two transitions per bit period for a binary "0" value. The present invention will operate with all these bi-phase encoding schemes and with any other encoding scheme that utilizes an even number of transitions per bit cell period for one binary value and an odd number of transitions per bit cell period for another binary value.

The present invention is illustrated and explained in reference to the bi-phase-space encoding scheme wherein two transitions occur at each bit cell period for each binary "1" value and one transition occurs in each bit cell period for each binary "0" value.

The error detection circuitry of the present invention is utilized at the data decoding end of a digital data transmission system. FIG. 1 illustrates a typical decoding system in block diagram form when a bi-phase encoded data stream is supplied by line 12 to a transition detector 14 of well-known structure, which detects each transition occurring in the bi-phase data stream and, in response thereto, generates two pulse streams on parallel lines 18 and 16. Pulse path 16, for example, represents the transitions occurring as a result of the "0" bit cells, and pulse path 18 represents the transitions occurring as a result of the "1" bit cells.

These ones and zeros bit cell pulses are traditionally known as ones and zeros clock signals. The ones and zeros clock signals on lines 16 and 18 are supplied to an NRZ recovery circuit 20 of well known structure. The NRZ recovery circuit 20 converts the ones and zeros clock signal which also contain the data to a NRZ encoded digital data stream wherein, for example, the "1" bits are represented by a high level signal and the "0"

bits are represented by a low level signal. Such an NRZ coded data stream requires a clocking signal for decoding, and thus, the ones and zeros clock signals on lines 18 and 16 are utilized in conjunction with the NRZ data signal on line 22 at some utilization device (not shown).

In addition to being supplied to a utilization device, the ones and zeros clock signals on lines 18 and 16, respectively, are at the same time supplied to the error detection circuitry 11 of the present invention, shown in FIG. 2. For the chosen example of the bi-phase-space encoding scheme, the "1" clock signals, as supplied to the clock input of "D" type flip-flop 13, and the "0" clock signals are supplied to the second input of NAND gate 15.

The $\overline{Q}$ output of "D" type flip-flop 13 is supplied over line 23 to the "D" input of flip-flop 13. The Q output of flip-flop 13 is supplied over line 25 to the first input of NAND gate 15. The output of NAND gate 15 is supplied over lines 29 to the reset input of "D" flip-flop 13, to the input of a logic inverter 17 and to the input of one-shot multi-vibrator 19. One-shot multi-vibrator 19, when triggered by the signal on line 29 from NAND gate 15, generates a pulse having a width that is dependent upon the RC time constant of the RC circuit made up of resistor 33 and capacitor 31. This pulse is generated by the one-shot multi-vibrator 19 on its output line 35. Its occurrence indicates that an error has occurred. The output of logic inverter 17 on line 37 provides a short sharp pulse that also indicates the occurrence of an error. However, these short sharp pulses may be used to drive a counter (not shown) which would indicate the number of errors occurring in the string of encoded binary data just received.

The operation of the error detection circuitry of FIG. 2 will now be explained in connection with the pulse diagram of FIG. 3. An exemplary data bit stream is assumed to be the data bit stream 41. These one and zero data bits are encoded within their respective bit cells illustrated at 43. The NRZ coding for the bits 41 is shown as a pulse train 45. The bi-phase-space coding for the bits 41 is shown as a pulse train 47.

The total transitions resulting from the bi-phase-space encoding, pulse train 47, is shown as transition pulse train 49. The pulses in pulse train 49 resulting from the zero data bits is shown as a 0's clock 51. The pulses in pulse train 49 resulting from the one data bits is shown as a 1's clock 53. The 0's and 1's clock signals, pulse trains 51 and 53, are supplied to NAND gate 15 over line 16 and "D" type flip-flop 13 over line 18, respectively.

As a result of the 1's clock received by the "D" type flip-flop 13 at its clock input, the Q output of flip-flop 13 will be as illustrated in pulse train 55. That is, for each 2 transitions, a positive pulse is generated on line 25 to one input of NAND gate 15. The 0's clock pulses of pulse train 51 are being supplied to the second input of NAND gate 15. Because the 0's clock pulses are being received at a time when the first input on line 25 to NAND gate 15 is at a low level, the output of NAND gate 15, as shown in pulse train 57, does not vary from its normal high level. As a result, the error count output on line 37, as shown in pulse train 59, remains at its normal low level and one-shot multi-vibrator 19 does not get triggered. This explains the error-free operation of the error detection circuitry of FIG. 2.

In magnetic storage systems, such as tape and disc systems, which utilize high-density bi-phase encoding schemes with which the present invention is very useful and well adapted, the major cause of errors is bit drop out and phase distortion. Bit drop out involves the loss of several transitions, if not more, during the recovery of data from the recording medium. Phase distortion results from the unequal transmission times of the output datas' various frequency components through the reproduce channel.

Transitions pulse train 61 illustrates such a movement by transition 85 to a new position illustrated by dashed line 87. As a result of such a movement, the 0's clock train 63 will not change. However, the 1's clock train 65 will change because the moved transition 85 will not be detected as a 1's clock in the area 89 in which it was supposed to be but is not. The 1's clock transition train 65 will, therefore, have one less transition therein.

As a result of the 1's clock train 65, the Q output of flip-flop 13 generates its pulses as shown in pulse train 67. However, at the occurrence of 0's clock 91, the Q output of flip-flop 93 is at a high level rather than a low level, causing the output of NAND gate 15 to generate a high-to-low transition 95 at its output on the line 29. This transition is supplied to the reset input of "D" flip-flop 13 causing it to reset at time 93 and thereby continue to respond to the 1's clock signals received at its clocking input as shown in pulse train 67.

As a result of the high-to-low transition 95 at the output of NAND gate 15, logic inverter 17 generates a count signal 97, as shown in pulse train 71, and one-shot multi-vibrator 19, triggered by the high-to-low transition 95 at its input, generates a pulse having a width determined by the RC time constant of resistor 33 and capacitor 31.

This pulse is preferably connected to an indicating device, such as a lamp or a light-emitting diode (not shown), to give a visual indication that an error has occurred. The above example illustrated the movement of a 1's transition into a zero data bit bit cell area.

How the error detection circuitry of the present invention detects the movement of a 0's transition will now be explained. Referring now to the transitions pulse train 73, assume that transition 99, which is a zero bit cell transition, moves to a new position as illustrated by the dashed line 100. As a result, the 0's clock pulse train 75 will be changed since no 0's clock transition will occur in area 101. However, the moved 0's transition will be detected as an extra 1's clock transition in area 103, as shown in 1's clock train 77.

As a result of "D" type flip-flop 13 receiving the 1's clock signals, shown in train 77, it will respond as shown in pulse train 79. Therefore, as a result of the moved 0's transition 103, the Q output of flip-flop 13 will go high at time 105 and low again at the next clock pulse and so on, until time 109, when the Q output is high at the time that a 0's clock 107 shown in pulse train 75 occurs.

As noted earlier, the occurrence of a 0's clock at the input of NAND gate 15 at the time the Q output of flip-flop 13 is high causes the output of NAND gate 15 on line 29 to have a high-to-low transition 111. This resets "D" type flip-flop 13 at time 109 to continue to respond to the ones transitions. The high-to-low occurrence 111 at the output of NAND gate 15, as shown in pulse train 81, causes the logic converter 17 to generate a low-to-high error count pulse 113, as shown by pulse train 83. The high-to-low transition 111 at the output of NAND gate 15 also triggers one-shot multi-vibrator 19, causing it to generate a long pulse error indication signal to a visual indication device (not shown).

The error count pulses, such as 113 and 97, are preferably supplied to a counter (not shown) which will indicate, upon interrogation, how many errors occurred within a certain length of time, computer word, etc., whatever parameter is programmed into the counter.

It should be understood that the present invention is not limited to error detection on bi-phase-space encoded binary data nor to bi-phase encoded binary data, but may be utilized on any encoded binary data wherein an odd number of transitions is used for one data bit, such as "1," and an even number of transitions is used for another data bit, such as "0," or vice versa. Many modifications and variations of the present invention are possible in light of the above teachings. It is, therefore, to be understood that within the scope of the appended claims the invention may be practiced otherwise than as specifically described by claims.

What is claimed is:

1. A real-time error detection system for bi-phase or similarly encoded binary data wherein a binary "1" and binary "0" clock signal is generated during the decoding of said data, said error detection system comprising:

means for storing the transitions of the binary values (either "1" or "0") which are represented by an even number of transitions per bit cell;

means for interrogating said storing means upon the occurrence of the other binary values (either "1" or "0") which are represented by an odd number of transitions per bit cell; and means for indicating an error if said storing means contains an odd number of transitions when interrogated.

2. The real-time error detection system of claim 1 further comprising:

means for generating an error count signal each time an error is indicated by said indicating means.

3. The real-time error detection system of claim 1 wherein said storing means comprises a D-type flip-flop which receives the binary "1" clock at its clock input.

4. The real-time error detection system of claim 3 wherein said interrogating means comprises a dual input gate which receives the binary "0" clock at one input and the output of said D-type flip-flop at the other input.

5. The real-time error detection system of claim 4 wherein the output of said dual input gate is connected to a reset input of sad D-type flip-flop.

6. The real-time error detection system of claim 5 wherein said indicating means comprises a one-shot multi-vibrator receiving the output of said dual input gate at its triggering input.

7. The real-time error detection system of claim 5 wherein the $\overline{Q}$ output of said D-type flip-flop is connected to its D input.

8. The real-time error detection system of claim 1 wherein said storing means receives the binary "1" clock signals.

9. The real-time error detection system of claim 8 wherein said interrogating means receives the binary "0" clock signals.

10. The real-time error detection system of claim 1 wherein said storing means receives the binary "0" clock signals.

11. The real-time error detection system of claim 10 wherein said interrogating means receives the binary "1" clock signals.

12. The real-time error detection system of claim 11 wherein said storing means comprises a D-type flip-flop.

13. The real-time error detection system of claim 12 wherein said interrogating means comprises a dual input gate which receives the binary "1" clock at one input and the output of said D-type flip-flop at the other input.

14. A real-time error detection system for bi-phase or similarly encoded binary data wherein a binary "1" and binary "0" clock signal is generated during the decoding of said data, said error detection system comprising:

a D-type flip-flop receiving the binary "1" clock signal at its clock input, its $\overline{Q}$ output being connected to its D input;

a two input NAND gate receiving the binary "0" clock at one input and the Q output of said D-type flip-flop at its other input, the output of the NAND gate being connected to the reset input of said D-type flip-flop; and a one-shot multi-vibrator receiving the output of said NAND gate at its triggering input, said multi-vibrator generating an error indicating signal having a duration dependent on the RC time constant of said multi-vibrator.

* * * * *